(12) United States Patent
Yoshino et al.

(10) Patent No.: US 9,255,657 B2
(45) Date of Patent: Feb. 9, 2016

(54) PIPE JOINT

(75) Inventors: Makoto Yoshino, Okazaki (JP);
Masakazu Kondo, Azumio (JP)

(73) Assignees: DENSO CORPORATION, Kariya, Aichi-pref. (JP); DENSO AIR SYSTEMS CORPORATION, Anjo, Aichi-pref. (JP)

( * ) Notice: Subject to any disclaimer, the term of this patent is extended or adjusted under 35 U.S.C. 154(b) by 86 days.

(21) Appl. No.: 13/317,946

(22) Filed: Nov. 1, 2011

(65) Prior Publication Data

US 2012/0133125 A1     May 31, 2012

(30) Foreign Application Priority Data

Nov. 29, 2010    (JP) .................................. 2010-265369

(51) Int. Cl.
*F16L 33/00*      (2006.01)
*F16L 33/207*    (2006.01)

(52) U.S. Cl.
CPC .................................. *F16L 33/2073* (2013.01)

(58) Field of Classification Search
CPC .............. F16L 33/2076; F16L 33/2073; F16L 33/2071; F16L 33/207
USPC .................... 285/256, 242, 259, 382
See application file for complete search history.

(56) References Cited

U.S. PATENT DOCUMENTS

| | | | | |
|---|---|---|---|---|
| 2,358,019 A | * | 9/1944 | Melsom ........................ | 285/256 |
| 2,374,226 A | * | 4/1945 | Melsom ...................... | 285/222.4 |
| 3,530,900 A | * | 9/1970 | Kish ............................. | 138/109 |
| 4,330,142 A | * | 5/1982 | Paini ............................. | 285/256 |
| 4,407,532 A | * | 10/1983 | Patel et al. ..................... | 285/256 |
| 4,522,435 A | * | 6/1985 | Miller et al. .................. | 285/256 |
| 4,544,187 A | * | 10/1985 | Smith ........................... | 285/256 |
| 4,657,285 A | * | 4/1987 | Akiyama et al. .............. | 285/256 |
| 5,344,196 A | * | 9/1994 | Kozuka et al. ............. | 285/222.4 |

(Continued)

FOREIGN PATENT DOCUMENTS

| | | |
|---|---|---|
| CN | 201496698 | 6/2010 |
| DE | 10 2005 028 689 | 2/2006 |

(Continued)

OTHER PUBLICATIONS

Office Action dated Mar. 22, 2012 issued in corresponding German Patent Application No. 10 2011 087 176.4 with English translation.

(Continued)

*Primary Examiner* — Aaron Dunwoody
(74) *Attorney, Agent, or Firm* — Harness, Dickey & Pierce, P.L.C.

(57) ABSTRACT

A pipe joint includes a soft pipe, a hard pipe and a sleeve. The hard pipe includes an insert portion inserted into an inside of the soft pipe from an end portion of the soft pipe. The sleeve is arranged radially outside of the insert portion and the soft pipe, and presses the soft pipe toward the insert portion. The insert portion includes a corrugated surface, which is arranged on an outer surface of the insert portion, and a column surface, which is arranged on the outer surface at a tip side of the insert portion. The sleeve includes a first small diameter portion, which is arranged radially outside of the corrugated surface and presses the soft pipe toward the corrugated surface, and a second small diameter portion arranged radially outside of the column surface and presses the soft pipe toward the column surface.

29 Claims, 8 Drawing Sheets

(56) References Cited

U.S. PATENT DOCUMENTS

| | | | | |
|---|---|---|---|---|
| 5,358,012 | A * | 10/1994 | Kish | 138/109 |
| 5,387,016 | A * | 2/1995 | Joseph et al. | 285/148.16 |
| 5,417,461 | A * | 5/1995 | Dougherty et al. | 285/256 |
| 5,797,629 | A * | 8/1998 | Beagle | 285/256 |
| 6,619,699 | B2 * | 9/2003 | Brumfield | 285/256 |
| 6,874,823 | B2 * | 4/2005 | Viegener | 285/256 |
| 7,387,317 | B2 * | 6/2008 | Chisnell | 285/256 |
| 7,566,078 | B2 * | 7/2009 | Piccinali | 285/256 |
| 7,661,720 | B2 * | 2/2010 | Nakano et al. | 285/242 |
| 2002/0092719 | A1 * | 7/2002 | Brumfield et al. | 188/152 |
| 2003/0205898 | A1 * | 11/2003 | Baldwin et al. | 285/256 |
| 2004/0020545 | A1 * | 2/2004 | Takagi et al. | 138/109 |
| 2004/0119283 | A1 * | 6/2004 | Furuta | 285/256 |
| 2004/0195831 | A1 * | 10/2004 | Ohya | 285/242 |
| 2004/0222632 | A1 * | 11/2004 | Viegener | 285/256 |
| 2006/0011249 | A1 * | 1/2006 | Arima et al. | 138/109 |
| 2006/0071469 | A1 * | 4/2006 | Romanelli et al. | 285/256 |
| 2007/0152442 | A1 * | 7/2007 | Cleveland et al. | 285/256 |
| 2007/0222212 | A1 * | 9/2007 | Chisnell | 285/256 |
| 2008/0036203 | A1 * | 2/2008 | Piccinali | 285/256 |
| 2010/0259039 | A1 * | 10/2010 | Bohl et al. | 285/241 |
| 2012/0007356 | A1 * | 1/2012 | Menor | 285/257 |

FOREIGN PATENT DOCUMENTS

| | | |
|---|---|---|
| JP | 4-18791 | 2/1992 |
| JP | 5-1793 | 1/1993 |
| JP | 11-311384 | 11/1999 |
| JP | H11-325360 | 11/1999 |
| JP | 2006-002911 | 1/2006 |
| JP | 2007-321857 | 12/2007 |

OTHER PUBLICATIONS

Office Action issued Dec. 24, 2013 in corresponding JP Application No. 2010-265369 (with English translation).

Office Action issued May 16, 2014 in corresponding CN Application No. 2011 1037 1243.2 (with English translation).

Office Action dated Oct. 17, 2013 in the corresponding CN application No. 2011 1037 1243.2 with English translation thereof.

* cited by examiner

PIPE JOINT

CROSS REFERENCE TO RELATED APPLICATION

This application is based on Japanese Patent Application No. 2010-265369 filed on Nov. 29, 2010, the disclosures of which are incorporated herein by reference in their entirety.

BACKGROUND OF THE INVENTION

1. Field of the Invention

The present invention relates to a pipe joint.

2. Description of Related Art

A pipe joint that connects a rubber tube and a metal pipe has been known. For instance, JP 11-311384A, JP 4-18791U, JP 5-1793A and JP 2007-321857A teach a technique of the pipe joint provided with a corrugated surface, which has a plurality of annular grooves and annular projects at an outer peripheral wall surface of the metal pipe. In the pipe joint, the metal pipe is radially inwardly inserted and placed in the rubber tube, and a metal sleeve is placed outside of the rubber tube. Furthermore, the rubber tube is pressed and fitted to the corrugated surface in a manner where a small diameter portion, i.e., a pressed portion, is provided by deforming the sleeve radially inside. In the above structure, it is limited that the rubber tube is separated from the metal pipe, by the combination of the corrugated surface of the metal tube and the small diameter portion of the sleeve.

According to the conventional structure, the sleeve has one or more small diameter portions. The small diameter portions are only located radially outside of the corrugated surface, since the small diameter portions are provided to press the rubber tube to the corrugated surface.

However, in the conventional structure, the corrugated surface is formed adjacent to an end portion of the metal pipe. Therefore, stress concentration may occur at the rubber tube of the end portion of the metal pipe.

Specifically, in a case of the pipe joint recited in JP 2007-321857A, the stress concentration may occur in the rubber tube at the end portion of the metal pipe, since the small diameter portion of the sleeve is placed adjacent to the end portion of the metal pipe.

Furthermore, in JP 11-311384A and JP 4-18791 U, a straight pipe portion that has a predetermined length is formed at the end portion of the metal pipe. However, in the above described structure, the body size of a pipe joint will possibly be large.

SUMMARY OF THE INVENTION

In view of the foregoing and other problems, it is an object of the present invention to provide a pipe joint, which can be effectively downsized while improving durability.

It is another object of the present invention to provide a pipe joint which can be effectively downsized while reducing a stress collection applied to a soft pipe.

According to an example of the present invention, a pipe joint includes a soft pipe, a hard pipe and a sleeve. The hard pipe includes an insert portion which is inserted into an inside of the soft pipe from an end portion of the soft pipe. The sleeve is arranged radially outside of the insert portion and the soft pipe, and presses the soft pipe toward the insert portion. The insert portion includes a corrugated surface, which is arranged on an outer surface of the insert portion, and a column surface, which is arranged on the outer surface of the insert portion on a tip side with respect to the corrugated surface. The sleeve includes a first small diameter portion, which is arranged radially outside of the corrugated surface and presses the soft pipe toward the corrugated surface, and a second small diameter portion which is arranged radially outside of the second column surface and presses the soft pipe toward the column surface.

Accordingly, the pipe joint can be effectively downsized while improving the durability. Furthermore, it is possible to effectively reduce a stress collection applied to the soft pipe.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
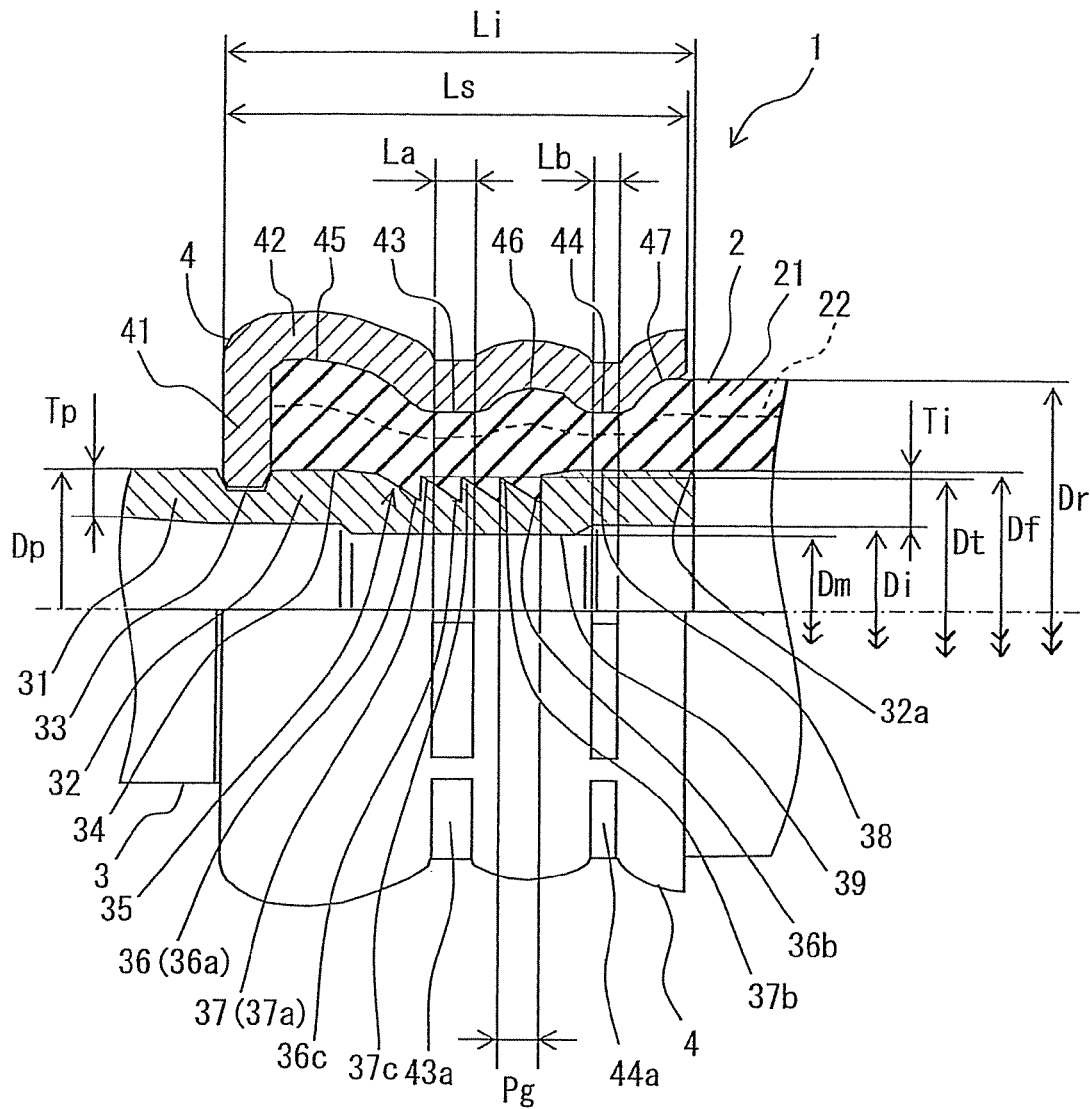
FIG. 1 is a partial enlarged cross-sectional view showing a pipe joint according to a first embodiment of the present invention.

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 2:
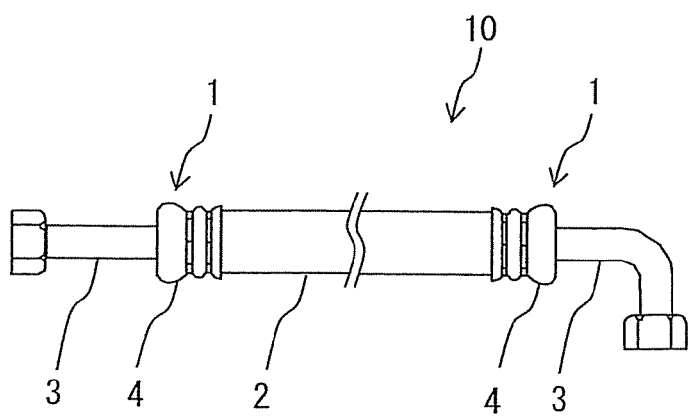
FIG. 2 is a top view showing a pipe unit provided with the pipe joint of the first embodiment.

A first embodiment will be described with reference to FIGS. 1 to 5. FIG. 1 is a partial enlarged cross-sectional view showing a pipe joint 1 according to the first embodiment of the present invention. FIG. 2 is a top view showing a pipe unit 10 provided with the pipe joint 1 of the first embodiment.

The pipe joint 1 is formed at each of two ends of a hose 2 in the flexible pipe unit 10, which is used in a refrigeration cycle device of a vehicle, for example. The pipe unit 10 is used to connect a compressor arranged in a vehicle engine and a component of the refrigeration cycle of the vehicle. The pipe unit 10 has a soft tube made of a resilient material, and a metal connector pipe, which is arranged at each of two ends of the soft tube. The soft tube is provided with the hose 2, which is principally made of an elastic material such as resin and rubber. The connector pipe is a hard pipe, and is provided with a pipe 3 made of a metal material. The pipe joint 1 connects the hose 2 with the pipe 3.

The pipe joint 1 has a sleeve 4 made of metal. The hose 2 is a multi-layer rubber tube. The hose 2 has a rubber layer 21 and a fiber layer 22. An outer side of the pipe 3 is covered with the hose 2 in a manner where a predetermined length of an end portion of the pipe 3 is covered with the hose 2. Specifically, the predetermined length of the end portion of the pipe 3 is inserted into the hose 2 through an end opening of the hose 2.

The pipe 3 is made of aluminum, copper or steel. The pipe 3 has a preform portion 31 and an insert portion 32. The preform portion 31 is kept at a shape of an unprocessed tubular preform. The insert portion 32 is inserted into the hose 2 from the end opening of the hose 2 by the predetermined length. An annular groove 33, which is fixing portion for fixing the sleeve 4, is formed between the preform portion 31 and the insert portion 32. The groove 33 is formed in an outer peripheral wall surface of the pipe 3.

The insert portion 32 has a first column surface 34, a corrugated surface 35 and a second column surface 38. The second column surface 38, the corrugated surface 35 and the first column surface 34 are arranged in this order from a tip side of the insert portion 32.

The first column surface 34 is formed as a part of an outside surface of the insert portion 32 and is arranged in the insert portion 32 at a base side of the corrugated surface 35. The first column surface 34 is located adjacent to the groove 33. The first column surface 34 is provided at a location, which is the closest place to the preform portion 31 in the insert portion 32. A location of the insert portion 32, in which the first column surface 34 is arranged, is also called a base portion. The first column surface 34 is formed to have a predetermined length in an axial direction of the pipe joint 1 such that the first column surface 34 makes contact with an inside surface of the hose 2 over a predetermined length. A length of the first column surface 34 in the axial direction is smaller than a length of the corrugated surface 35 in the axial direction.

The corrugated surface 35 (uneven surface) is formed as a part of the outside surface of the insert portion 32 and has a plurality of the annular grooves 36 and a plurality of ribs 37. The corrugated surface 35 is provided in an approximately center part of the insert portion 32 in the axial direction by a predetermined length. The corrugated surface 35 is located between the first column surface 34 and the second column surface 38. The corrugated surface 35 is defined by a plurality of annular slopes. The slopes include a small slope where the surface inclination with respect to the axis of the pipe 3 is small, and a large slope where the surface inclination with respect to the axis of the pipe 3 is large. The groove 36 and the rib 37 are alternately arranged one after another. The corrugated surface 35 has a serrated cross-section. In the example shown in FIG. 1, the four grooves 36 and the three ribs 37 are alternately arranged one after another. The length of the corrugated surface 35 in the axial direction is larger than the length of the first column surface 34 in the axial direction, and is larger than the length of the second column surface 38 in the axial direction.

The groove 36 is defined by a pair of a small slope and a large slope. The small slope has a relatively small inclination with respect to the axis of the pipe 3, and the large slope has a relatively large inclination with respect to the axis of the pipe 3. The small slope, in which the inclination is relatively small, is located on a side of the first column surface 34, and the large slope, in which the inclination is relatively large, is located on a side of the second column surface 38, in each grove 36. In the example of FIG. 1, the large slope of the groove 36 is approximately perpendicular to the axis of the pipe 3. The groove 36 is recessed radially inside such that the small slope faces toward the tip end of the insert portion 32.

The rib 37 has a pair of a small slope and a large slope. The small slope has a relatively small inclination with respect to the axis of the pipe 3, and the large slope has a relatively large inclination with respect to the axis of the pipe 3. The small slop, in which the inclination is relatively small, is located on the side of the second column surface 38, and the large slope, in which the inclination is relatively large, is located on the side of the first column surface 34, in each rib 37. In the example of FIG. 1, the large slope of the rib 37 is approximately perpendicular to the axis of the pipe 3. The rib 37 projects radially outside such that the small slope faces toward the tip end of the insert portion 32.

The second column surface 38 is formed as a part of the outside surface of the insert portion 32 and is arranged at the end side of the insert portion 32 axially outside of the corrugated surface 35. The second column surface 38 is provided at a location adjacent to the tip end of the insert portion 32. The second column surface 38 is formed to have a predetermined length in the axial direction such that the second column surface 38 makes contact with the inside surface of the hose 2 by a predetermined length. The length of the second column surface 38 in the axial direction is smaller than the length of the corrugated surface 35 in the axial direction.

In a radially inside surface of the insert portion 32, a small diameter portion 39 is arranged to correspond to a radially inside surface of the corrugated portion 35.

The insert portion 32 and the groove 33 are formed in a processing of the end portion of the pipe 3. First, the insert portion 32 is formed in the end portion of a preform pipe. The process includes a step, in which the preform of the end portion, i.e., a portion to be used as the insert portion 32, is pressed in the axial direction so as to increase a thickness of the preform in the radial direction. Furthermore, the process includes a step, in which the corrugated surface 35 is formed radially outside of the insert portion 32. The corrugated surface 35 is formed by a rolling process. In the rolling process, the insert portion 32 and a forming roller are rotatable relative to each other, in a state where the forming roller is pressed to the outside surface of the insert portion 32. Thereby, the annular groove 36 and the rib 37 are formed in the outside surface of the insert portion 32. Thus, the groove 36 is a rolling groove. The small diameter portion 39 is adapted to keep a thickness of the corrugated surface 35.

The sleeve 4 is made of metal in a tubular shape. The sleeve 4 can be formed by the same material as the pipe 3. The sleeve 4 is arranged radially outside of the end portion of the insert portion 32 and the hose 2. The sleeve 4 is a member, by which the hose 2 is pressed toward the insert portion 32. The hose 2, the pipe 3, and the sleeve 4 are arranged to overlap in the radial direction each other.

The sleeve 4 has an annular plate portion 41 and a cylindrical portion. The annular plate portion 41 includes a plate part that radially extends in a direction perpendicular to the axial direction of the pipe 3. An edge of radially inner side of the annular plate portion 41 is loosely engaged with the groove 33. Thereby, the sleeve 4 is held on the pipe 3. The sleeve 4 is supported by the pipe 3 in the axial direction of the pipe 3 and the radial direction of the pipe 3. One end portion of the cylindrical portion 42 is adapted as a base portion, and is continuously connected to the annular plate portion 41. The cylindrical portion 42 is open at an opening edge in a circular shape at the other end portion thereof. The hose 2 is inserted from the opening edge at the other end portion of the cylindrical portion 4. The cylindrical portion 42 is configured to cover the radially outer side of the inserted part of the hose 2.

The cylindrical portion 42 has a plurality of annular small diameter portions 43, 44 and a plurality of annular large diameter portions 45, 46, 47. The cylindrical portion 42 has the only first and second small diameter portions 43, 44, in the example of FIG. 1. The two small diameter portion 43, 44 is used as pressed portion (e.g., swaged portion, crimped portion). The first small diameter portion 43 is located adjacent to the base portion of the cylindrical portion 42, so that the first small diameter portion 43 is used as a base side pressed portion. The second small diameter portion 44 is located adjacent to the end portion of the cylindrical portion 42, so that the second small diameter portion 44 is used as an end-side pressed portion. The small diameter portions 43, 44 and the large diameter portions 45, 46, 47 are alternately arranged one after another in the axial direction. An outer diameter of the small diameter portion 43, 44 is smaller than an outer diameter of the large diameter portion 45, 46, 47. An inner diameter of the small diameter portion 43, 44 is smaller than an inner diameter of the large diameter portion 45, 46, 47. The inner diameter of the small diameter portions 43, 44 is smaller than an inner diameter of a portion of the hose 2, which is not deformed by the sleeve 4. That is, the hose 2 is partially deformed radially inside by the sleeve 4. The hose 2 is pressed to the pipe 3 by the fastening force of the sleeve 4. A receiving space, in which the rubber material of the hose 2 stays, is formed at the radially inner side of the large diameter portion 45, 46, 47. The material of the hose 2 is deformed by the small diameter portion 43, 44, so that the material of the hose 2 is moved toward the receiving space of the large diameter portion 45, 46, 47. Furthermore, the material of the hose 2, which is deformed radially inside by the small diameter portion 43, is pressed and moved into the groove 36. A small empty space (not shown) may exist between the hose 2 and the bottom portion of the groove 36, for example.

The sleeve 4 has the first small diameter portion 43 and the second small diameter portion 44. The first small diameter portion 43 is formed at a radially outer side of the corrugated surface 35 and presses the hose 2 to the corrugated surface 35. The second small diameter portion 44 is formed at a radially outer side of the second column surface 38 and presses the hose 2 to the second column surface 38. The first large diameter portion 45, which is located between the annular plate portion 41 and the first small diameter portion 43 and has a larger inner diameter than the inner diameter of the first small diameter portion 43, is arranged in the cylindrical portion 42. The second large diameter portion 46, which is located between the first small diameter portion 43 and the second small diameter portion 44 and has a larger inner diameter than the inner diameter of the first small diameter portion 43 and the second small diameter portion 44, is arranged in the cylindrical portion 42. The third large diameter portion 47 is arranged in the cylindrical portion 42. The third large diameter portion 47 is located between the second small diameter portion 44 and the opening edge of the cylindrical portion 42 and has a larger inner diameter than the inner diameter of the second small diameter portion 44. The inner diameter of the third large diameter portion 47 becomes larger along the axial direction toward the opening edge of the cylindrical portion 42. The inner diameter of the third large diameter portion 47 does not become smaller along the axial direction toward the opening edge of the cylindrical portion 42. An axial length of the large diameter portion 45 extended in the axial direction is larger than that of the large diameter portion 46. An axial length of the large diameter portion 46 extended in the axial direction is larger than that of the large diameter portion 47. A volume of the receiving space for receiving the hose material, which is defined by the large diameter portion 45, is larger than a volume of the receiving space for receiving the hose material, which is defined by the large diameter portion 46. The volume of the receiving space for receiving the hose material, which is defined by the large diameter portion 46, is larger than a volume of the receiving space for receiving the hose material, which is defined by the large diameter portion 47.

A cylindrical preform for the sleeve 4 is processed in a press working such that the sleeve 4, which has the annular plate portion 41 and the cylindrical portion 42, is formed. The sleeve 4 is fixed around the pipe 3, and the hose 2 is inserted between the pipe 3 and the sleeve 4. Then, the small diameter portions 43, 44 are formed in the sleeve 4. The sleeve 4 is pressed radially inside and is deformed plastically such that the small diameter portions 43, 44 are formed in the sleeve 4. The small diameter portions 43, 44 are formed by pressing (e.g., swaging, crimping), using a mold die. The mold die is arranged at a radially outer side of the cylindrical portion 42. The mold die has a plurality of mold die pieces, each which is arranged in annular shape. The mold die pieces are pressed radially inside, so that the small diameter portions 43, 44 are formed by the pressing. Therefore, tracks 43a, 44a are left at the radially outer surface of the cylindrical portion 42 by the mold die pieces.

The sleeve 4 may have three parts, i.e., a base portion, a center portion and an end portion arranged in this order from the annular plate portion 41. In this case, the first small diameter portion 43 is located in a range of the center portion. Furthermore, the second small diameter portion 44 is located in a range of the end portion. In the base portion, only the large diameter portion 45 is arranged.

The first small diameter portion 43 is located radially outside of the corrugated surface 35. The first small diameter portion 43 is located only within an axial range directly radially outside of the corrugated surface 35. The first small diameter portion 43 is not located directly radially outside of the first column surface 34 and directly radially outside of the second column surface 38. Specifically, the corrugated surface 35 is located to be overlapped with the first small diameter portion 43 in the axial direction. The corrugated surface 35 is not overlapped with the second small diameter portion 44 in the axial direction.

The second small diameter portion 44 is located radially outside of the second column surface 38. The second small diameter portion 44 is located only within an axial range directly radially outside of the second column surface 38. The second small diameter portion 44 is not located directly radially outside of the first column surface 34 and directly radially outside of the corrugated surface 35. Specifically, the second column surface 38 is located to be overlapped with the second small diameter portion 44 in the axial direction. The second column surface 38 is not overlapped with the first small diameter portion 43.

An axial length of the first small diameter portion 43 can be set by a length La corresponding to an axial length of the track 43a. An axial length of the second small diameter portion 44 can be set by a length Lb corresponding to an axial length of the track 44a.

At least one of bottom portions 36a of the grooves 36 and at least one of ridges 37a of the ribs 37 are arranged in a location, which is the axially outer side of the first small diameter portion 43 and is between the first small diameter portion 43 and the groove 33, i.e., in a range of the large diameter portion 45 in the axial direction. At least one of bottom portions 36b of the grooves 36 and at least one of ridges 37b of the ribs 37 are arranged in a location, which is the axially outer side of the first small diameter portion 43 and is between the first small diameter portion 43 and the second small diameter portion 44, i.e., in a range of the large diameter portion 46 in the axial direction. According to the example shown in FIG. 1, the two bottom portions 36b and the one ridge 37b are arranged in the axial range of the large diameter portion 46. Thus, at least one of the bottom portions 36a, 36b of the groove 36, which define the corrugated surface 35, is provided at both outside of the first small diameter portion 43, which is outside of the range of the axial length La of the first diameter portion 43.

At least one of the bottom portions 36c of the grooves 36 and at least one of the ridges 37c of the ribs 37 are located within the range of axial length La of the first diameter portion 43. Therefore, at least one of the ridges 37c of the rib 37, which define the corrugated surface 35, is located within the rang of the axial length La of the first diameter portion 43. Furthermore, at least one of the bottom portions 36c, which define the corrugated surface 35, is located within the range of the axial length La of the first diameter portion 43.

The length La is smaller than the axial length of the corrugated surface 35. The length La is substantially equal to a pitch Pg, which is measured from the groove 36 to the rib 37 (La=Pg). The length La and the pitch Pg can be set to satisfy the following equation La≥Pg. A length Lb is smaller than the axial length of the second column surface 38.

Figure 3:
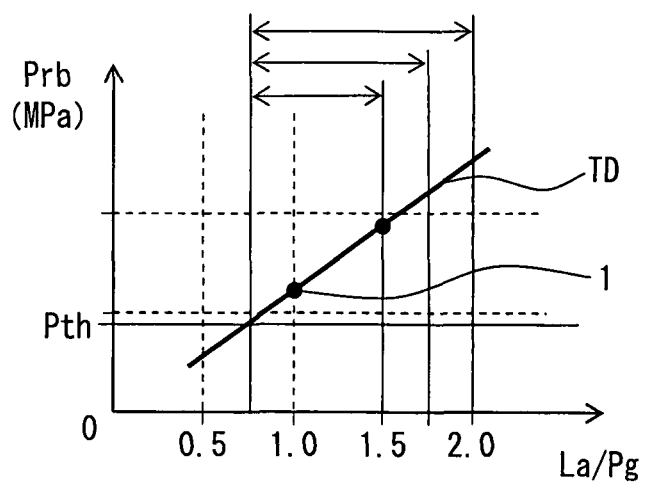
FIG. 3 is a diagram indicating pipe joint performance of the first embodiment.

FIG. 3 is a diagram indicating pipe joint performance of the first embodiment. The horizontal axis indicates a ratio (La/Pg) of the length La to the pitch Pg, and the vertical axis indicate a contact pressure Prb (MPa) that is applied to the ridge 37c of the rib 37, which are radially inside preform of the hose 2. The ridge 37c is located in the radially inside of the first small diameter portion 43. In order to ensure required sealing performance, it may be necessary that the contact pressure Prb is more than or equal to a threshold value Pth. In the pipe joint 1, the high contact pressure that is more than or equal to the threshold value Pth is achieved. A trend graph (TD) is shown in FIG. 3, in which as the length La increases, the contact pressure Prb increases. However, as the length La becomes large, the length of the sleeve 4 becomes large. In addition, the smaller the length of the pitch Pg becomes, the higher contact pressure Prb can be achieved. However, when the length of the pitch Pg becomes small, it may be difficult to form the corrugated surface 35. Therefore, the ratio (La/Pg) of the length La to the pitch Pg is set within a range, such that a predetermined contact pressure Prb can be achieved, and the size of the sleeve 4 does not become large and high productivity can be achieved. The ratio (La/Pg) of the length La to the pitch Pg can be set within a range, such that the ratio La/Pg is more than or equal to a lower limit and is less than or equal to an upper limit. La/Pg=0.75 or 1.0, can be adopted as the lower limit value. La/Pg =1.5, 1.75 or 2.0, can be adopted as the upper limit value. Specifically, the ratio La/Pg can be set within a range from 0.75 to 2.0. It is more desirable that the ratio La/Pg can be set within a range from 0.75 to 1.75.

Furthermore, it is more desirable that the ratio La/Pg can be set within a range from 0.75 to 1.5.

The length Lb is smaller than the axial length of the second column surface 38. The length Lb is smaller than the length La (i.e., La>Lb). The length La can be set to be larger than or equal to the length Lb (La≥Lb). By satisfying the relationship of La≥Lb, the axial length of the large diameter portion 47 can be large. Thereby, the contact pressure (stress) applied to the hose 2 can be limited.

A maximum thickness Ti of the insert portion 32, which is measured in the radial direction, is larger than or equal to a thickness Tp of the preform portion 31, which is measured in the radial direction. Thereby, the required strength of the insert portion 32 can be increased. The thickness Ti and the thickness Tp can be set to satisfy the following equation Ti≥Tp.

A maximum outer diameter Df the first column surface 34 and second column surface 38 is smaller than or equal to an outer diameter Dp of the preform portion 31. The outer diameter Df and the outer diameter Dp can be set to satisfy the following equation Df≥Dp. An inner diameter Dm of the small diameter portion 39 is smaller than or equal to an inner diameter Di of the preform portion 31. The inner diameter Dm and the inner diameter Di can be set to satisfy the following equation Dm≥Di.

A maximum outer diameter Dt of the corrugated surface 35, i.e., the outer diameter Dt at the ridge of the rib 37, is smaller than or equal to the outer diameter Df.

The outer diameter Dt and the outer diameter Df can be set to satisfy the following equation Dt≥Df. Furthermore, the outer diameter Dt is smaller than or equal to the outer diameter Dp. The outer diameter Dt and the outer diameter Dp can be set to satisfy the following equation Dt≥Dp.

A length Li of the insert portion 32, which is measured in the axial direction, is substantially equal to a length Ls of the sleeve 4, which is measured in the axial direction. The length Li and the length Ls can be set to satisfy the following equation Li≥Ls. However, it is desirable that the length Li is set to be slightly longer than the length Ls. This structure prevents a corner 32a, which is arranged radially outside of the end portion of the insert portion 32, from applying excessive contact force to the hose 2.

Figure 4:
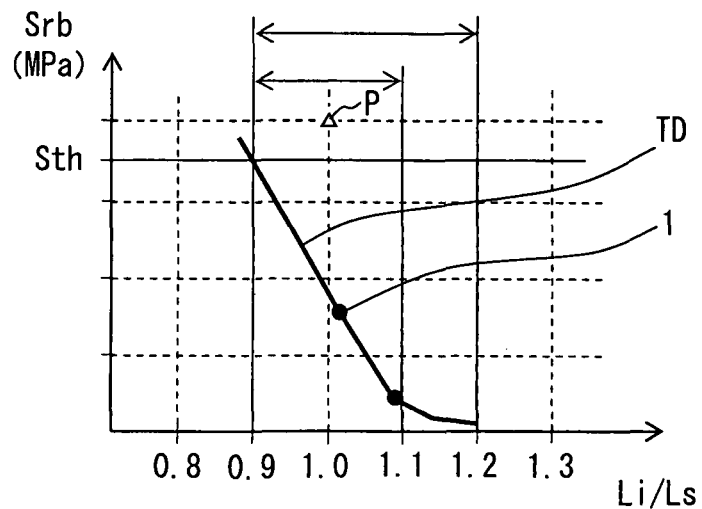
FIG. 4 is a diagram indicating pipe joint performance of the first embodiment.

FIG. 4 is a diagram indicating performance of the pipe joint 1 of the first embodiment. The horizontal axis of the FIG. 4 indicates a ratio (Li/Ls) of the length Ls to the length Li. The vertical axis of the FIG. 4 indicates an initial contact pressure Srb (MPa) that is applied to the corner 32a of the insert portion 32 of the hose 2. A triangular plot in FIG. 4 shows a state of a conventional pipe joint. The triangular plot P shows the state of FIG. 1 in JP 2007-321857A. A threshold value Sth is shown in FIG. 4. The threshold value Sth is the initial contact pressure (initial stress), at which the rubber material of the hose 2 is torn off in a predetermined endurance test. The predetermined endurance test is JRA2012, which is provided by the "Japan Refrigeration and Air Conditioning Industry Association" and is a vibration test for R134a refrigerant hose of an automobile air-conditioning device. Therefore, it is desirable that the initial contact pressure is less than or equal to the threshold value Sth. In the conventional pipe joint, it may be difficult to make the contact pressure to be lower than the threshold value Sth. In the pipe joint 1 of the present embodiments, the initial contact pressure can be limited to lower than the threshold value Sth. Therefore, it can be prevented that the rubber material of the hose 2 is torn off. A trend graph (TD) is shown in FIG. 4, in which as the ratio Li/Ls decreases, the initial contact pressure Srb increases. Even under the state of the inevitable trend graph (TD), the ratio Li/Ls can be set within a range, such that the ratio Li/Ls is more than or equal to a lower limit and is less than or equal to an upper limit. Li/Ps=0.9 or 1.0, can be adopted as the lower limit value. Li/Ps=1.1 or 1.2, can be adopted as the upper limit value. Specifically, the ratio Li/Ls can be set within a range from 0.9 to 12. It is more desirable that the ratio Li/Ls can be set within a range from 0.9 to 1.1. Furthermore, it is more desirable that the ratio Li/Ls can be set within a range from 1.0 to 1.1. Even under the state of the inevitable trend graph (TD), by setting the ratio Li/Ls within the range described above, the pipe joint 1 can be downsized and high durability of the pipe joint 1 can be achieved. A length Ls of the sleeve 4, which is measured in the axial direction of the pipe 3, is substantially equal to an outer diameter Dr of the hose 2. The length Ls can be set to satisfy the following equation Ls≤Dr. However, it is desirable that the length Ls is set to be slightly smaller than the outer diameter Dr. The length Ls is approximately 20 mm.

Figure 5:
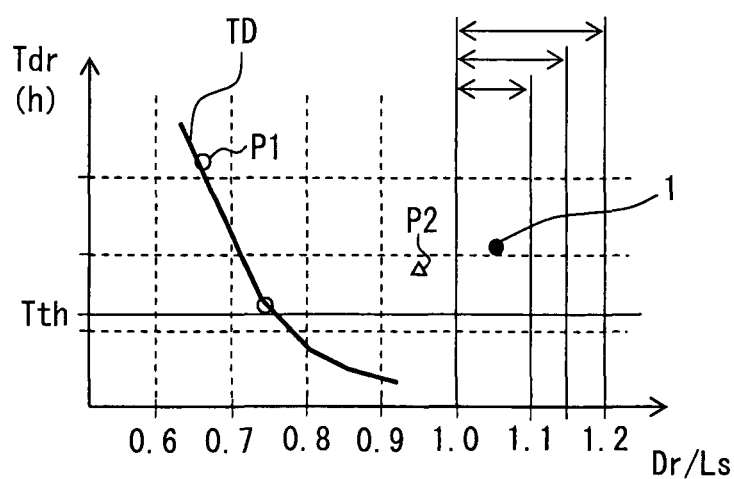
FIG. 5 is a diagram indicating pipe joint performance of the first embodiment.

FIG. 5 is a diagram indicating performance of the pipe joint 1 of the first embodiment. The horizontal axis of the FIG. 5 indicates a ratio (Dr/Ls) of the outer diameter Dr to the length Ls as an aspect ratio of the pipe joint 1. The horizontal axis indicates time Tdr of a predetermined endurance test. The time Tdr corresponds to time after the heat aging of a pipe joint at 120° C., so that an inner fluid leaks out, in the endurance test. A circular plot P1 and a triangular plot P2 in FIG. 5 show a state of the conventional pipe joint. The circular plot P1 corresponds to the state of FIG. 6 in JP 2007-321857A. The triangular plot P2 corresponds to the state of FIG. 1 in JP 2007-321857A. As shown by the circular plots, a trend graph (TD) in FIG. 5 indicates that as the ratio Dr/Ls increases, the endurance time Tdr is decreased. In this endurance test, it is required that the inner fluid does not leak out after the testing time is over a threshold value Tth. In the pipe joint 1, even in a state where the ratio Dr/Ls is more than or equal to 1.0, the endurance time, which is more than or equal to the threshold value Tth, can be achieved. Therefore, the length Ls and the outer diameter Dr can be set to satisfy the following equation Ls≤Dr. The ratio (Dr/Ls) of the outer diameter Dr to the length Ls can be set within a range from a lower limit to an upper limit. Dr/Ls=1.0, can be adopted as the lower limit value. If the ratio Dr/Ls is less than 1.0, the shape of the sleeve 4 becomes slender in the axial direction of the pipe 3. Dr/Ls=1.1, 1.15 or 1.2, can be adopted as the upper limit value. Specifically, the ratio Dr/Ls can be set within a range from 1.0 to 1.2. Furthermore, it is more desirable that the ratio Dr/Ls can be set within a range from 1.0 to 1.1. By setting the ratio Li/Ls within the range described above, the pipe joint 1 can be downsized and high durability of the pipe joint 1 can be achieved.

According to the example of the present embodiment, the pipe joint 1, which has the two small diameter portions 43, 44, is provided. The first small diameter portion 43 and the second small diameter portion 44 are adapted to keep the tightness (fastening) between the hose 2 and the pipe 3 in the axial direction of the pipe 3. At this time, the first small diameter portion 43 presses the hose 2 to the corrugated surface 35, so that the first small diameter portion 43 is more effectively adapted to keep the tightness. Furthermore, the first large diameter portion 45 is arranged between the first small diameter portion 43 and the annular plate portion 42, and the first small diameter portion 43 presses the hose 2 so that the rubber material of the hose 2 is pressed into the receiving space of the inside of the large diameter portion 45. Thereby, the anchor portion, which limits the slide of the hose 2 in the axial direction of the pipe 3, is formed in the first large diameter portion 45, so that the anchor portion is adapted to keep the tightness.

In contrast, the second small diameter portion 44 presses the hose 2 to the second column surface 38, so that the second small diameter portion 44 is adapted to keep the tightness between the hose 2 and the pipe 3 in the axial direction of the pipe 3. Furthermore, the second large diameter portion 46 is arranged between the first small diameter portion 43 and the second small diameter portion 44, and the second small diameter portion 44 presses the hose 2 so that the rubber material of the hose 2 is pressed into the receiving space of the inside of the large diameter portion 46. Thereby, the anchor portion, which limits the slide of the hose 2 in the axial direction of the pipe 3, is formed in the second large diameter portion 46, so that the anchor portion is adapted to keep the tightness.

The first small diameter portion 43 presses the hose 2 to the corrugated surface 35, so that the first small diameter portion 43 is adapted to keep the sealing performance of the hose 2 and the pipe 3. High surface pressure is steadily generated between the first small diameter portion 43 and the corrugated surface 35, so that the high surface pressure can be effectively adapted to keep the high sealing performance between the hose 2 and the pipe 3. At least one of the grooves 36 and at least one of the ribs 37 are located within the range of axial length La, so that the high sealing performance can be achieved. Specifically, the bottom portion 36c of the groove 36 and the ridge 37c of the rib 37 are located within the range of axial length La, so that the high sealing performance can be achieved. Furthermore, at least one of the grooves 36 and at least one of the ribs 37 are arranged at both outsides of the range of axial length La, so that the high sealing performance can be achieved. Specifically, the bottom portion 36a of the groove 36 and the ridge 37a of the rib 37 are arranged in a location, which is outside of the range of axial length La and is base side of the insert portion 32. Furthermore, the bottom portion 36b of the groove 36 and the ridge 37b of the rib 37 are arranged in a location, which is outside of the range of axial length La and is tip side of the insert portion 32, so that the high sealing performance can be achieved. In addition, the second small diameter portion 44 presses the hose 2 to the second column surface 38, so that the second small diameter portion 44 is also adapted to keep the sealing performance between the hose 2 and the pipe 3.

The second small diameter portion 44 presses the hose 2 to the second column surface 38, which dose not have corrugated portion (uneven portion), so that the second small diameter portion 44 is adapted to suitably hold the hose 2. The second small diameter portion 44 and the second column surface 38 limit the movement of the hose 2, which is generated by pressurization and vibration in the pipe unit 10. The second small diameter portion 44 and the second column surface 38 do not cramp the hose 2 excessively. Thereby, the second small diameter portion 44 and the second column surface 38 limit the deterioration of the hose 2 and also limit to convey the movement of the hose 2 to the adjacent portion of the first small diameter portion 43.

As discussed above, in the present embodiment, the second small diameter portion 44 and the second column surface 38 press the hose 2 with a flat surface, and limit the movement (vibration) of the hose 2. Thereby, the deterioration of the resilient material of the hose 2, e.g., the rubber tearing off, is limited. Furthermore, the combination of the first small diameter portion 43 and the corrugated surface 35 provides the concentrated force in the inside of the sleeve 4, to which the movement (vibration) of the hose 2 is not conveyed. Thereby, the secure sealing performance can be achieved. In this way, the two small diameter portions 43, 44 share the function, so that both downsizing and high durability of the pipe joint 1 can be achieved.

(Second Embodiment)

Figure 6:
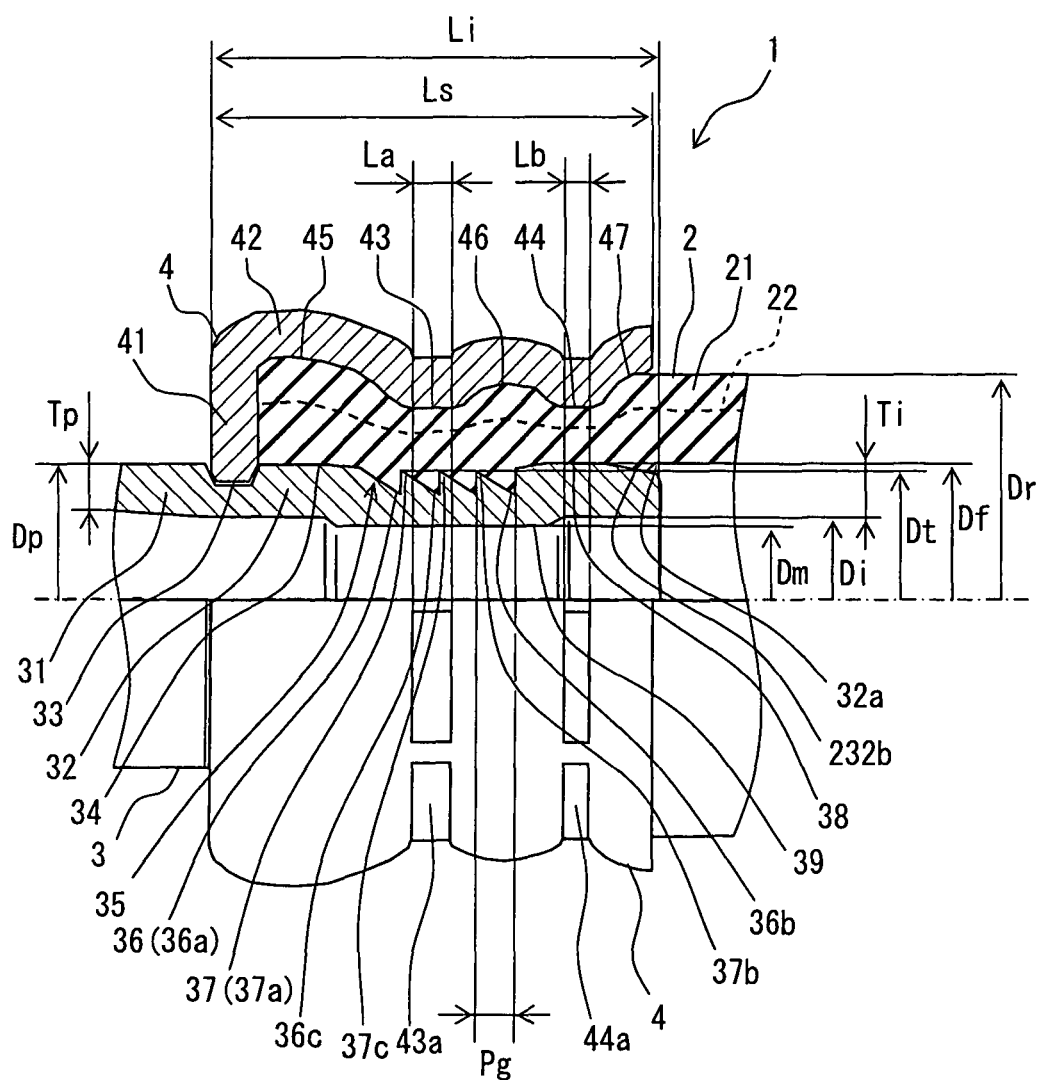
FIG. 6 is a partial enlarged cross-sectional view showing a pipe joint according to a second embodiment of the present invention.

A second embodiment will be described with reference to FIG. 6. FIG. 6 is a partial enlarged cross-sectional view showing a pipe joint 1 according to the second embodiment of the present invention. In the above-described first embodiment, the first column surface 34, the corrugated surface 35 and the second column surface 38 are arranged on the radially outside surface of the insert portion 32. However, in addition to the first column surface 34, the corrugated surface 35 and the second column surface 38, the insert portion 32 is provided with another surface as the part of the radially outside surface of the insert portion 32. In the second embodiment, a partially conical portion 232b is arranged between the second column surface 38 and the corner 32a. The partially conical portion 232b effectively limits pressure applied to the hose 2. In the second embodiment, the other parts of the pipe joint 1 may be similar to those of the above-described first embodiment.

(Third Embodiment)

Figure 7:
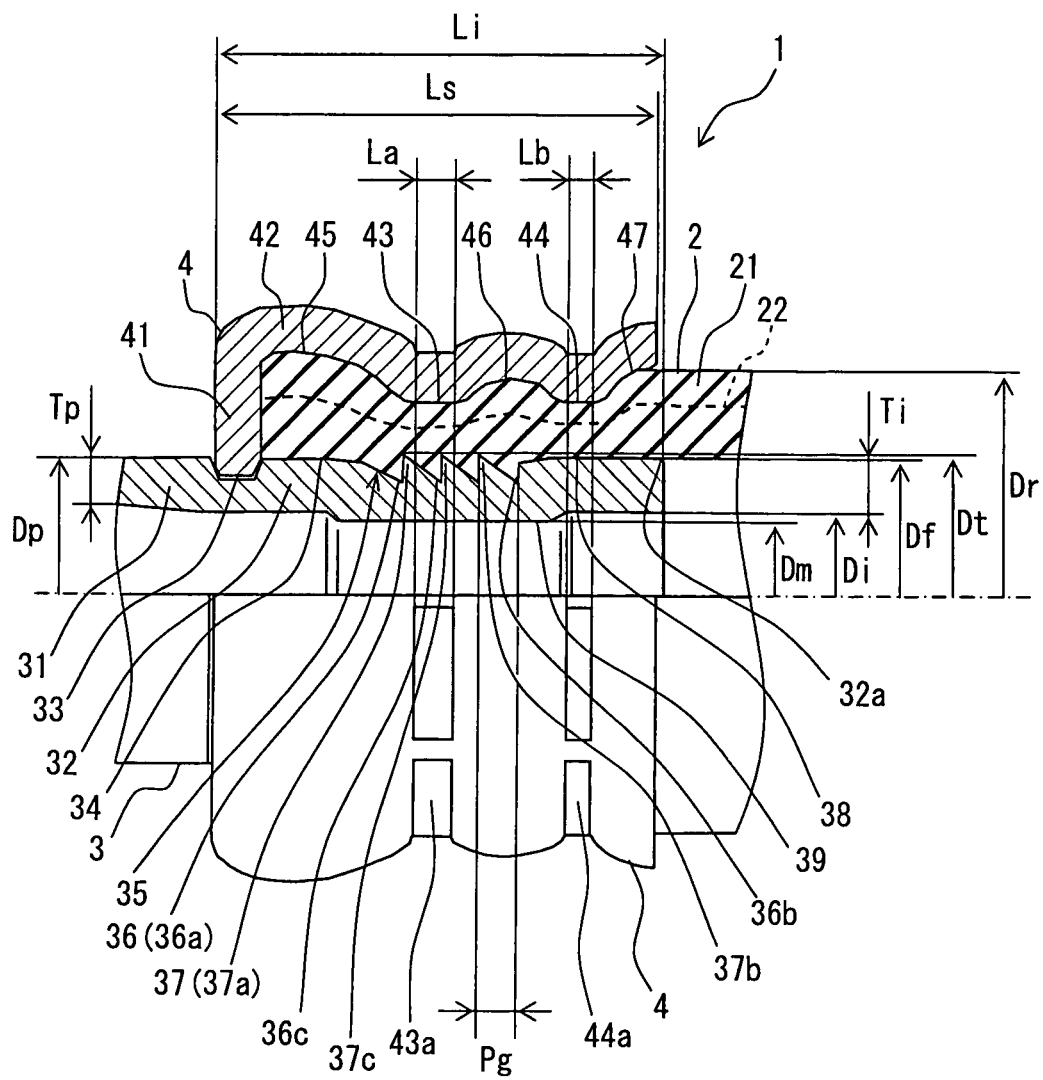
FIG. 7 is a partial enlarged cross-sectional view showing a pipe joint according to a third embodiment of the present invention.

A third embodiment will be described with reference to FIG. 7. FIG. 7 is a partial enlarged cross-sectional view showing a pipe joint 1 according to the third embodiment of the present invention. In the first embodiment, the insert portion 32 is configured to satisfy the following equation Dt≤Df. Instead of the above described configuration, the insert portion 32 can be configured to satisfy the following equation Dt>Df. In the third embodiment, the ribs 37 of a corrugated surface 335 are configured to satisfy a state, where an outer diameter Dt of the corrugated surface 35 is larger than an outer diameter Df of the first column surface 34 and the second column surface 38. In this structure, high pressure is applied to the ridges 37a, 37b, 37c of the ribs 37. Furthermore, in this structure, the amount of compression of the hose 2 between the second small diameter portion 44 and the second column surface 38 can be relatively decreased rather than the amount of compression of the hose 2 between the first small diameter portion 43 and the corrugated surface 35. As a result, the above described structure effectively limits the force applied to the hose 2. In the third embodiment, the other parts of the pipe joint 1 may be similar to those of the above-described first embodiment.

(Fourth Embodiment)

Figure 8:
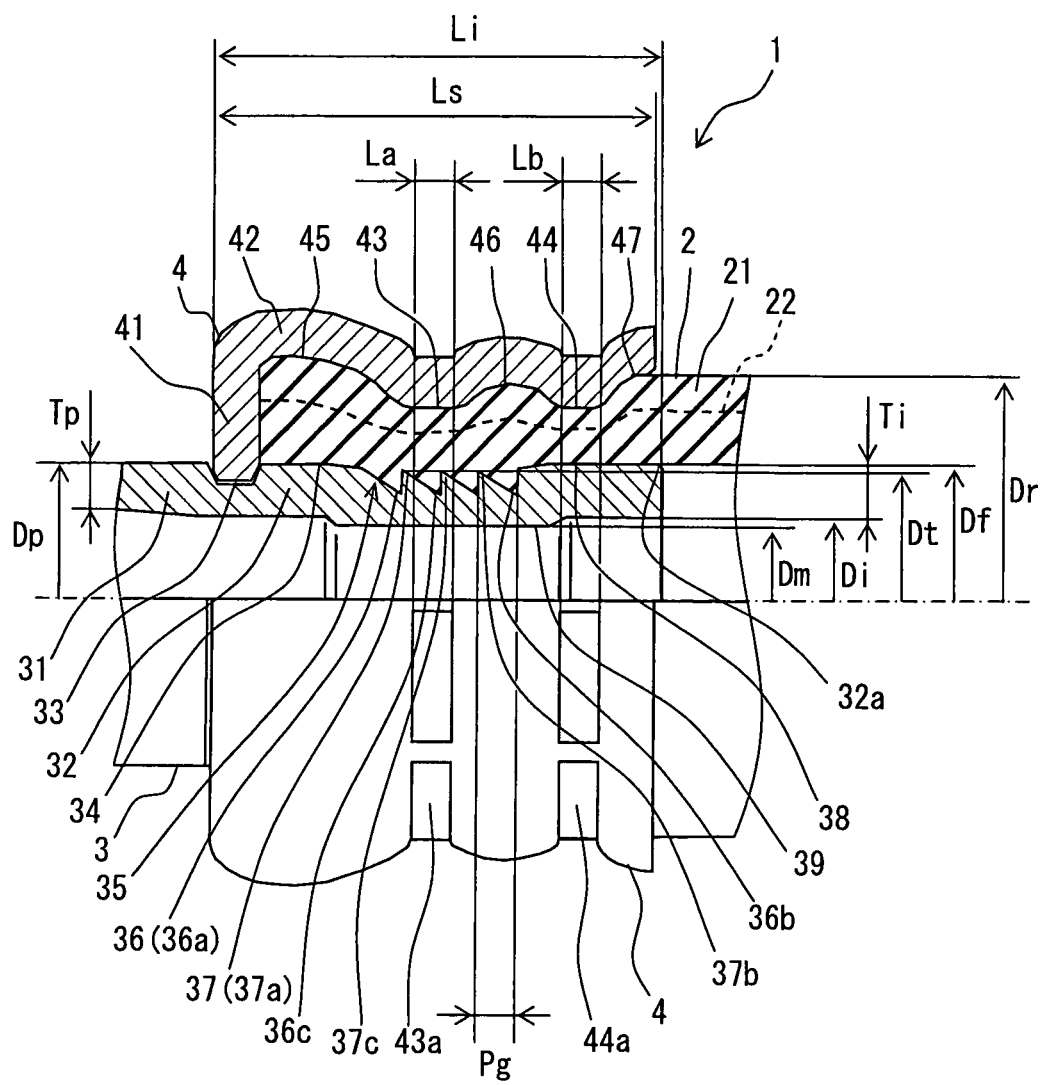
FIG. 8 is a partial enlarged cross-sectional view showing a pipe joint according to a fourth embodiment of the present invention.

A fourth embodiment will be described with reference to FIG. 8. FIG. 8 is a partial enlarged cross-sectional view showing a pipe joint 1 according to the fourth embodiment of the present invention. In the first embodiment, the length La and the length Lb are set to satisfy the following equation La>Lb. Instead of the above described relation, the axial length La of the first small diameter portion 43 and the axial length Lb of the second small diameter portion 44 can be set to satisfy the following equation La≥Lb. In the fourth embodiment, the axial length Lb of the second small diameter portion 44 is set to be equal to the axial length La of the first small diameter portion 43 (La=Lb). Also, in the fourth embodiment, the hose 2 is suitably held by the second small diameter portion 44 and the second column surface 38. In the fourth embodiment, the other parts of the pipe joint 1 may be similar to those of the above-described first embodiment.

(Fifth Embodiment)

Figure 9:
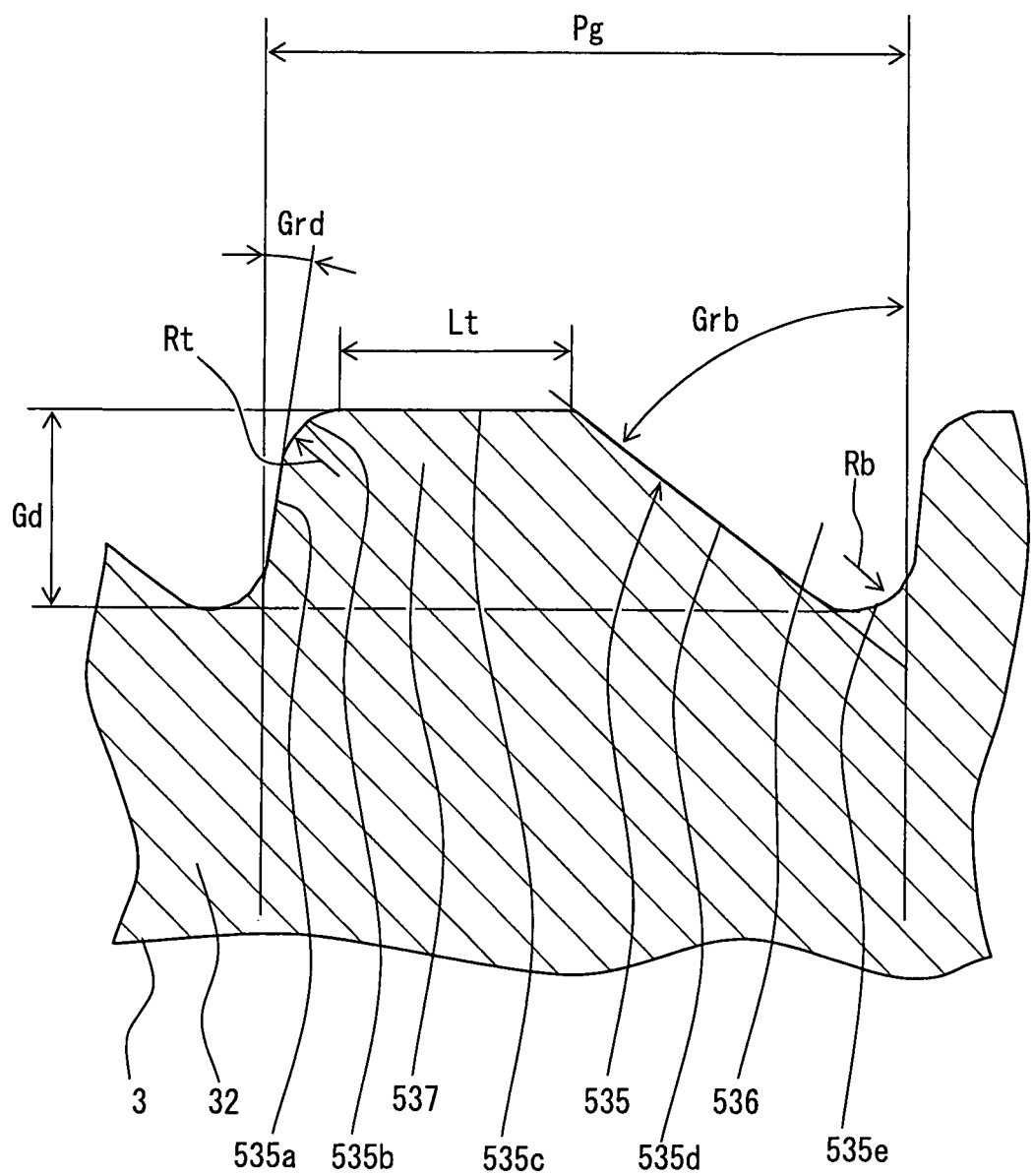
FIG. 9 is a partial enlarged cross-sectional view showing a pipe joint according to a fifth embodiment of the present invention.

A fifth embodiment will be described with reference to FIG. 9. FIG. 9 is a partial enlarged cross-sectional view showing a pipe joint 1 according to the fifth embodiment of the present invention. In the first embodiment, the cross-sectional shape of the groove 36 and that of the rib 37, which are formed on the corrugated surface 35, have the serrated form. In the fifth embodiment, a corrugated surface 535, which includes an annular column surface on a rib 537 as shown in FIG. 9, is used. The corrugated surface 535 includes an annular large slope 535a, where the surface inclination with respect to the axis of the pipe 3 is large, an annular convex 535b, an annular column surface 535c, an annular small slope 535d, where the surface inclination with respect to the axis of the pipe 3 is small, and an annular concave 535e. The corrugated surface 535 includes a groove 536 and a rib 537. The groove 536 is defined by the small slope 535d, the concave 535e, the large slope 535a and the convex 535b. The rib 537 is defined by the large slope 535a, the convex 535b, the column surface 535c, the small slope 535d and the concave 535e.

The shape of the corrugated surface 535 is configured to be formed by a rolling process. Furthermore, the shape of the corrugated surface 535 is configured such that the required amount of the resilient material, which intrudes into the groove 36 in order to achieve the predetermined sealing performance and the predetermined tightness, can be obtained.

A depth Gd of the corrugated surface 535, which is measured in radial direction of the pipe 3, is set to be larger than or equal to 0.3 mm. It is desirable that the depth Gd is set to be larger than or equal to 0.3 mm and to be smaller than or equal to 0.75 mm. The large slope 535a faces toward the base end of the pipe 3 relative to the radial direction of the pipe 3. An angle Grd of the large slope 535a is set to be smaller than or equal to 30 degrees. It is desirable that the angle Grd is set to be more than or equal to 0 degree and to be smaller than or equal to 20 degrees. A radius Rt (curvature radius) of the convex 535b is set to be more than or equal to 0.1 mm. The radius Rt can be set to be more than or equal to 0.1 mm and to be smaller than or equal to 0.3 mm. A length Lt of the column surface 535c is set to be smaller than or equal to a half of a pitch Pg (Lt ≤Pg/2). The small slope 535d faces toward the tip of the pipe 3 relative to the radial direction of the pipe 3. An angle Grb of the small slope 535d is set to be larger than the angle Grd of the large slope 535a. A radius Rb (curvature radius) of the concave 535e is approximately equal to the radius Rt of the convex 535b.

According to the corrugated surface 535 in the fifth embodiment, the corrugated surface 535 can be easily formed by the rolling process. Furthermore, the resilient material of the hose 2 can be easily intruded into the corrugated surface 535. Thus, the high sealing performance can be achieved in the pipe joint 1. In the fifth embodiment, the other parts of the pipe joint 1 may be similar to those of the above-described first embodiment.

(Sixth Embodiment)

Figure 10:
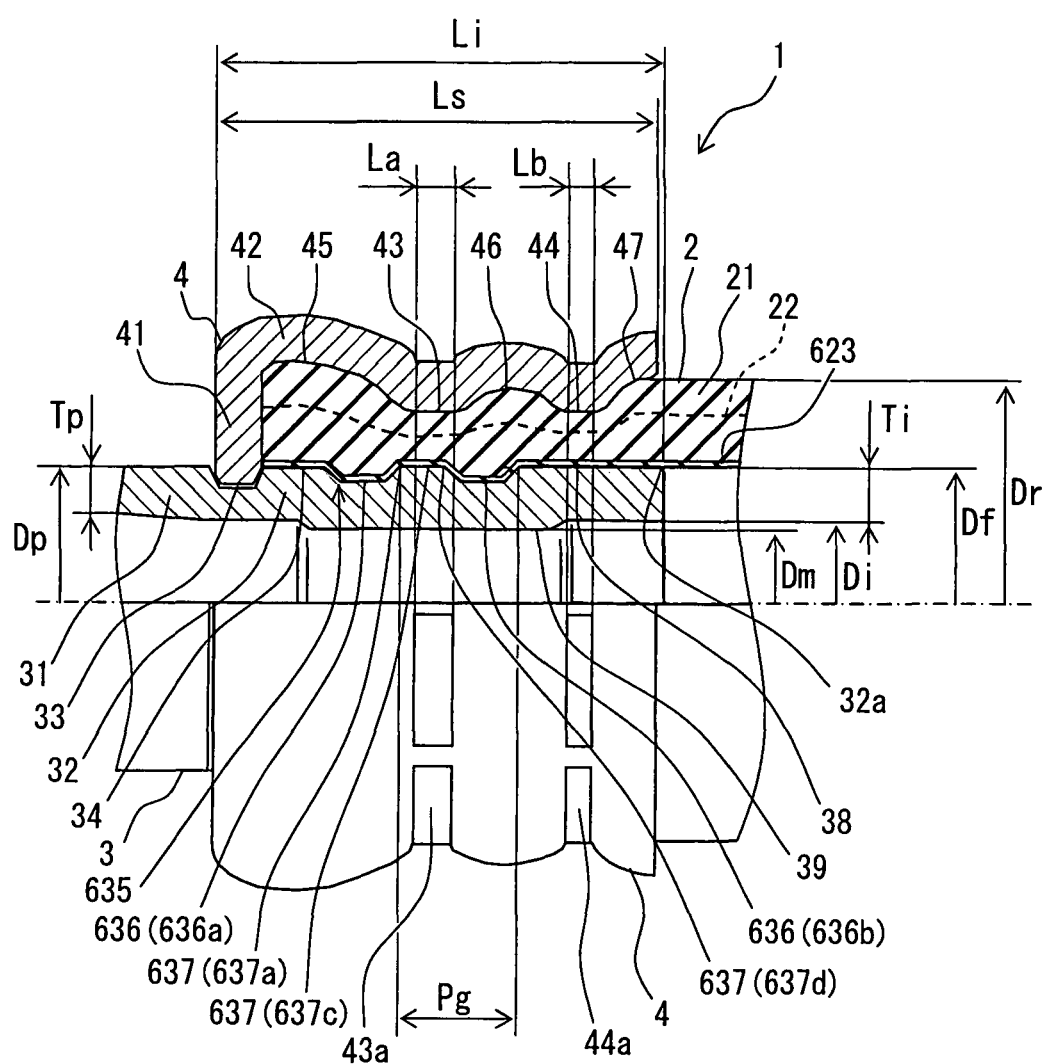
FIG. 10 is a partial enlarged cross-sectional view showing a pipe joint according to a sixth embodiment of the present invention.

A sixth embodiment will be described with reference to FIG. 10. FIG. 10 is a partial enlarged cross-sectional view showing a pipe joint 1 according to the sixth embodiment of the present invention. Instead of the hose 2 described in the first embodiment, in the sixth embodiment of the present invention, a hose 2 that has a resin layer 623 as a most radially inward layer thereof is used. Furthermore, instead of the corrugated surface 35 in the first embodiment, a trapezoidal corrugated surface 635 is used in the sixth embodiment. A pitch of ridges of the trapezoidal corrugated surface 635 is larger than that of the serrated corrugated surface 35. A slope of the trapezoidal corrugated surface 635 is slower than that of the serrated corrugated surface 35. The corrugated surface 635 limits the ripping off of the resin layer 623. Furthermore, in the sixth embodiment, a bonding agent is arranged between the radially inside surface of the hose 2 and the insert portion 32. The bonding agent is not shown in FIG. 10. The hose 2 is tightly joined to the insert portion 32 by the bonding agent, so that the bonding agent is adapted to keep the sealing performance of the hose 2 and the insert portion 32.

The corrugated surface 635 includes grooves 636 and ribs 637 alternately arranged in the axial direction. A bottom portion 636a of the groove 636 and a corner 637a of the ridge of the rib 637 are arranged in a location, which is axially outer side of the first small diameter portion 43 and is between the first small diameter portion 43 and the first column surface 34. The corner 637a is one of the two corners of the rib 637 and located on a base side of the rib 636 in the axial direction. A bottom portion 636b of the groove 636 is arranged in a location, which is axially outer side of the first small diameter portion 43 and is between the first small diameter portion 43 and the second column surface 38. Furthermore, a ridge surface 637c of the rib 637 and a corner 637d of the rib 637 are located within a range of the axial length La of the first diameter portion 43. The corner 637d is one of the two corners of the rib 637 and located on an end side of the rib 637 in the axial direction. A material of the hose 2, which is pressed and deformed toward the radially inside of the pipe 3 at the small diameter portion 43, is moved into each space on the two grooves 636, which are located at both outsides of the first small diameter portion 43 in the axial direction. Furthermore, the amount of the material of the hose 2 that is moved into the bottom portion 636a is larger than the amount of the material of the hose 2 that is moved into the bottom portion 636b. Thus, the hose 2 is tightly fixed to the corner 637a.

Also, in the sixth embodiment, the hose 2 is suitably held by the second small diameter portion 44 and the second column surface 38. Furthermore, the hose 2 can be fixed to the insert portion 32 by the first small diameter portion 43 and the corrugated surface 635. According to the sixth embodiment, it is possible to limit the ripping off of the hose 2 while achieving the both miniaturization and high durability of the pipe joint 1. In the sixth embodiment, the other parts of the pipe joint 1 may be similar to those of the above-described first embodiment.

(Seventh Embodiment)

Figure 11:
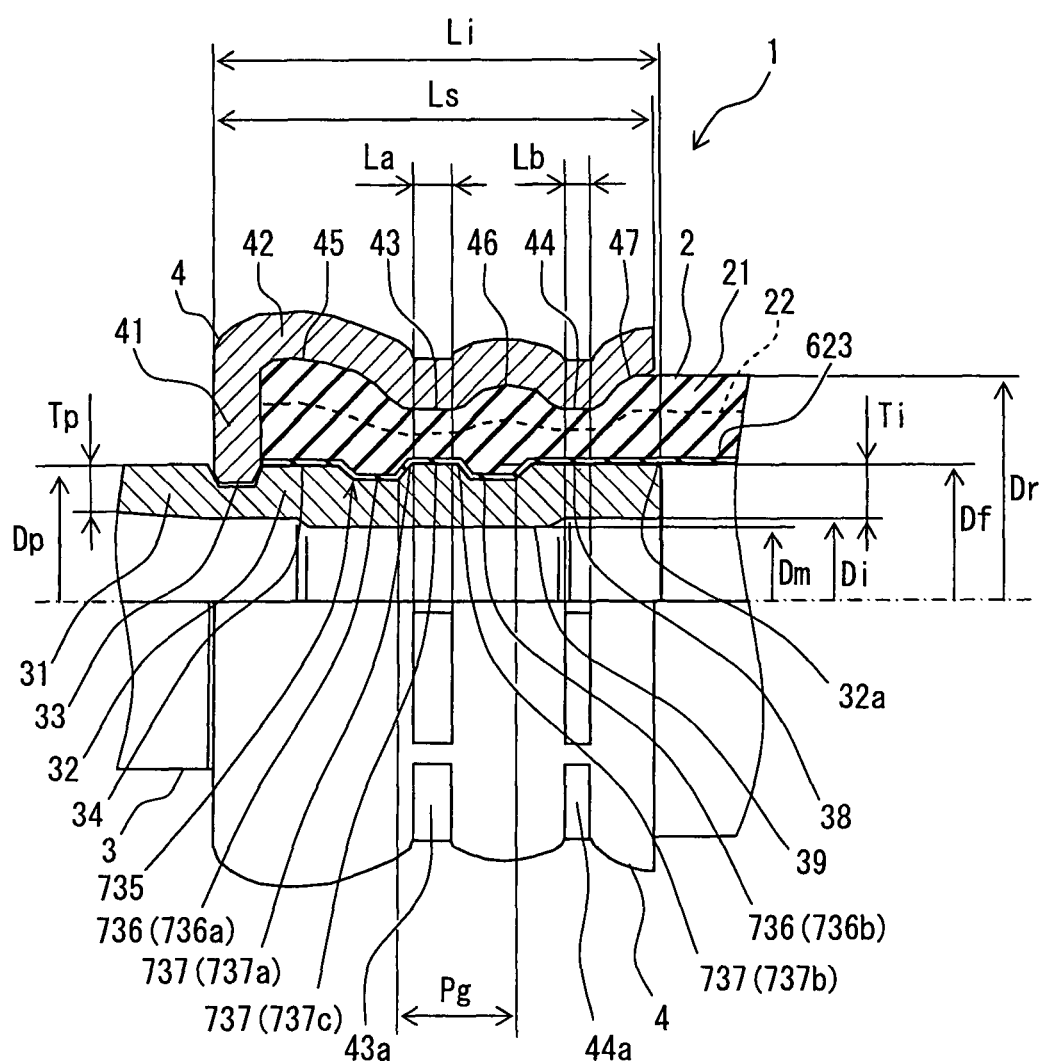
FIG. 11 is a partial enlarged cross-sectional view showing a pipe joint according to a seventh embodiment of the present invention.

A seventh embodiment will be described with reference to FIG. 11. FIG. 11 is a partial enlarged cross-sectional view showing a pipe joint 1 according to the seventh embodiment of the present invention. In the above described embodiments, at least one of the corners of the ridge is located within the range of the length La of the first small diameter portion 43. However, a structure, where the corner is not arranged within the range of the length La, can be used. The seventh embodiment is a modification example of the sixth embodiment. In the seventh embodiment, instead of the corrugated surface 635, a corrugated surface 735 is used.

The corrugated surface 735 includes plural grooves 736 and ribs 737, which are arranged alternatively in the axial direction. A bottom portion 736a of the groove 736 and a corner 737a of the ridge of the rib 737 are arranged in a location, which is axially outer side of the first small diameter portion 43 and is between the first small diameter portion 43 and the first column surface 34. A bottom portion 736b of the groove 736 and a corner 737b of the ridge of the rib 737 are arranged in a location, which is axially outer side of the first small diameter portion 43 and is between the first small diameter portion 43 and the second column surface 34. Furthermore, a ridge surface 737c of one rib 737 is located within the range of axial length La of the first diameter portion 43.

Also, in the seventh embodiment, the hose 2 is suitably held by the second small diameter portion 44 and the second column surface 38. Furthermore, the hose 2 can be fixed to the insert portion 32 by the first small diameter portion 43 and the corrugated surface 735. According to the seventh embodiment, it is possible to limit the ripping off of the hose 2 while achieving the both miniaturization and high durability of the pipe joint 1. In the seventh embodiment, the other parts of the pipe joint 1 may be similar to those of the above-described first and sixth embodiments.

(Other Embodiment)

The preferred embodiments of the present invention have been described. However, the present invention is not limited to the above embodiments, and the above embodiments may be modified in various ways without departing from the spirit and scope of the invention. The configuration of the above described embodiments is just examples. The invention in its broader terms is therefore not limited to the specific details, representative apparatus, and illustrative examples shown and described. The extent of the present invention is shown by the scope of the claims, and also includes the changes, which is equal to and within the same range of the scope of the claim.

In the above described embodiment, for example, the small diameter portion 43 includes the only one annular track 43a. Instead of this structure, the small diameter portion 43 may be defined by a plurality of tracks. The same structure may be applied to the second small diameter portion 44.

A small inclination may be formed on the first column surface 34 and/or the second column surface 38. In this case, the first column surface 34 and/or the second column surface 38 can be used as a part of a surface of a cone. Specifically, the first column surface 34 and/or the second column surface 38 can be a part of a surface of a cone, in which the diameter becomes gradually small along the axial direction of the pipe 3 toward a tip side of the insert portion 32.

What is claimed is:

1. A pipe joint comprising:
a single piece soft pipe made of a resilient material, the soft pipe further defining a multi-layer tube including an elastic material and a fiber layer;
a hard pipe having an annular groove formed therein and including an insert portion which is inserted into an inside of the soft pipe from an end portion of the soft pipe; and
a sleeve arranged radially outside of the insert portion and the soft pipe, the sleeve being in direct contact with the soft pipe and pressing the soft pipe toward the insert portion, the sleeve including an annular plate portion, the annular plate portion engaging the annular groove formed in the hard pipe, wherein
the insert portion includes
a corrugated surface which is provided on an outer surface of the insert portion to have a plurality of annular grooves and a plurality of ribs, and
a column surface which is arranged on the outer surface of the insert portion and located on a tip side of the insert portion immediately adjacent a first end of the corrugated surface,
the sleeve includes
a first small diameter portion which is arranged radially outside of the corrugated surface to press the soft pipe toward the corrugated surface,
a first large diameter portion which is directly connected to the annular plate portion and has an inner diameter larger than that of the first small diameter portion,
a first slope portion which is arranged between the first large diameter portion and the first small diameter portion and is directly connected to the first large diameter portion and the first small diameter portion, the first slope portion having an inner diameter that decreases in distance from the first large diameter portion, a second small diameter portion which is arranged only radially outside of the column surface and not the corrugated surface to press the soft pipe toward the column surface, a second large diameter portion which is arranged between the first small diameter portion and the second small diameter portion and has an inner diameter larger than that of the first small diameter portion, and a second slope portion which is arranged between the first small diameter portion and the second large diameter portion and is directly connected to the first small diameter portion and the second large diameter portion, the second slope portion having an inner diameter that increases in distance from the first small diameter portion; wherein the soft pipe is in direct contact with the insert portion over the entire length of the insert portion such that there is no open space between the soft pipe and the insert portion;

the column surface of the insert portion is a cylindrical surface without a groove;

each groove of the plurality of annular grooves has a first surface having a small slope and a second surface having a large slope, the small slope being smaller than the large slope, at least one of bottom portions of the grooves which define the corrugated surface is arranged on both outsides of a range of an axial length (La) of the first small diameter portion in an axial direction of the insert portion, at least one of the ribs which define the corrugated surface is arranged within the range of the axial length (La) of the first small diameter portion, at least one of the bottom portions of the grooves which define the corrugated surface is arranged within the range of the axial length (La) of the first small diameter portion, and the column surface has an outer diameter larger than a diameter of the bottom portions of the grooves which define the corrugated surface.

2. The pipe joint according to claim 1, wherein:
the first small diameter portion is arranged only radially outside of the corrugated surface.

3. The pipe joint according to claim 2, wherein:
the sleeve has
a cylindrical portion which is connected to the annular plate portion at one end side of the cylindrical portion, and has an opening end on the other end side of the cylindrical portion, wherein the cylindrical portion is arranged radially outside of the soft pipe; and
the cylindrical portion has
a third large diameter portion which is arranged between the second small diameter portion and an opening end, and has an inner diameter being gradually larger toward the opening end.

4. The pipe joint according to claim 1, wherein
the axial length (La) of the first small diameter portion is not less than an axial length (Lb) of the second small diameter portion.

5. The pipe joint according to claim 1, wherein
the axial length (La) of the small diameter portion is not less than a length of a pitch (Pg) of the corrugated surface.

6. The pipe joint according to claim 1, wherein
a ratio of an axial length (Ls) of the sleeve to an axial length (Li) of the insert portion is not less than 0.9 and not more than 1.1.

7. The pipe joint according to claim 1, wherein
the axial length (Ls) of the sleeve is not more than an outer diameter (Dr) of the soft pipe.

8. The pipe joint according to claim 1, wherein
a maximum outer diameter (Dt) of the corrugated surface is not more than an outer diameter (Dp) of a preform portion of the hard pipe located outside of the sleeve.

9. The pipe joint according to claim 1, wherein
a radial thickness (Tp) of the preform portion of the hard pipe which is located outside of the sleeve is less than a maximum thickness (Ti) of the insert portion which is measured in a radial direction.

10. The pipe joint according to claim 1, wherein
the plurality of grooves are rolled grooves.

11. The pipe joint according to claim 1, wherein
the column surface extends the entire distance between a terminal end of the insert portion and the corrugated surface.

12. The pipe joint according to claim 11, wherein
the second small diameter portion is arranged directly over the column surface in a radial direction.

13. The pipe joint according to claim 1, wherein
the second small diameter portion is arranged directly over the column surface in a radial direction.

14. The pipe joint according to claim 1, wherein all of the plurality of grooves are identical.

15. The pipe joint according to claim 1, wherein the small slope has a small inclination with respect to an axis of the insert portion and the large slope has a large inclination with respect to the axis of the insert portion, the small inclination being smaller than the large inclination.

16. The pipe joint according to claim 15, wherein the second surface with the large slope is generally perpendicular to the axis of the insert portion.

17. The pipe joint according to claim 1, wherein the insert portion includes a cylindrical surface on the outer surface of the insert portion immediately adjacent a second end of the corrugated surface opposite to the first end of the corrugated surface.

18. The pipe joint according to claim 1, wherein the annular plate portion is in direct contact with an end of the soft pipe in an axial direction of the hard pipe.

19. The pipe joint according to claim 1, wherein the annular plate portion is immediately adjacent to an end of the soft pipe in an axial direction of the hard pipe.

20. The pipe joint according to claim 1, wherein the elastic material of the soft pipe includes at least one of a resin and a rubber.

21. The pipe joint according to claim 1, wherein
the column surface of the insert portion is defined as a second column surface,
the insert portion further includes a first column surface which is arranged on the outer surface of the insert portion and located on a base side of the insert portion immediately adjacent a second end of the corrugated surface,
the small slopes and the large slopes of the grooves are arranged alternately in the corrugated surface between the first column surface and the second column surface,
one of the small slopes of the grooves at the second end of the corrugated surface is directly connected to the first column surface, and
a maximum outer diameter (Dt) of the small slope is smaller than a maximum outer diameter (Df) of the first column surface.

22. The pipe joint according to claim 1, wherein
the sleeve includes
- a third slope portion which is arranged between the second large diameter portion and the second small diameter portion and is directly connected to the second large diameter portion and the second small diameter portion, the third slope portion having an inner diameter that decreases in distance from the second large diameter portion,
- a third large diameter portion which is arranged on an opposite side of the second small diameter portion from the second large diameter portion and has an inner diameter larger than that of the second small diameter portion, and
- a fourth slope portion which is arranged between the second small diameter portion and the third large diameter portion and is directly connected to the second small diameter portion and the third large diameter portion, the fourth slope portion having an inner diameter that increases in distance from the second small diameter portion, and
the soft pipe is pressed by the sleeve toward the insert portion only at positions between the first large diameter portion and the third large diameter portion.

23. The pipe joint according to claim 1, wherein at least one of the plurality of ribs of the corrugated surface is arranged on both outsides of the range of the axial length (La) of the first small diameter portion in the axial direction of the insert portion.

24. The pipe joint according to claim 1, wherein an axial length of the first large diameter portion is larger than an axial length of the second large diameter portion in the axial direction.

25. The pipe joint according to claim 1, wherein
the first large diameter portion and the insert portion define therebetween a first receiving space for receiving the material of the soft pipe,
the second large diameter portion and the insert portion define therebetween a second receiving space for receiving the material of the soft pipe, and
a volume of the first receiving space is larger than a volume of the second receiving space.

26. The pipe joint according to claim 1, wherein a maximum outer diameter (Dt) of the corrugated surface is smaller than a maximum outer diameter (Df) of the first column surface.

27. A pipe joint comprising:
a single piece soft pipe made of a resilient material, the soft pipe further defining a multi-layer tube including an elastic material and a fiber layer;
a hard pipe having an annular groove formed therein and including an insert portion inserted into an inside of the soft pipe from an end portion of the soft pipe, the insert portion being in direct contact with the soft pipe over the entire length of the insert portion such that there is no space between the soft pipe and the insert portion; and
a sleeve including an annular plate portion engaging the annular groove formed in the hard pipe and radially extending from the hard pipe in a direction perpendicular to an axial direction of the hard pipe and the annual plate portion being in contact with an end of the soft pipe in the axial direction of the hard pipe, and a cylindrical portion arranged radially outside of the insert portion and the soft pipe and continuously extending from a radially end of the annular plate portion along the soft pipe, the cylindrical portion being in direct contact with the soft pipe and pressing the soft pipe toward the insert portion, wherein
the insert portion includes
- a corrugated surface which is provided on an outer surface of the insert portion to have a plurality of annular grooves and a plurality of ribs, and
- a column surface which is arranged on the outer surface of the insert portion and located on a tip side of the insert portion immediately adjacent a first end of the corrugated surface, the column surface being a cylindrical surface without a groove, the cylindrical portion of the sleeve includes
- a first small diameter portion which is arranged radially outside of the corrugated surface to press the soft pipe toward the corrugated surface,
- a first large diameter portion which is directly connected to the annular plate portion and has an inner diameter larger than that of the first small diameter portion,
- a first slope portion which is arranged between the first large diameter portion and the first small diameter portion and is directly connected to the first large diameter portion and the first small diameter portion, the first slope portion having an inner diameter that decreases in distance from the first large diameter portion,
- a second small diameter portion which is arranged only radially outside of the column surface and not the corrugated surface to press the soft pipe toward the column surface,
- a second large diameter portion which is arranged between the first small diameter portion and the second small diameter portion and has an inner diameter larger than that of the first small diameter portion, and
- a second slope portion which is arranged between the first small diameter portion and the second large diameter portion and is directly connected to the first small diameter portion and the second large diameter portion, the second slope portion having an inner diameter that increases in distance from the first small diameter portion, each groove of the plurality of annular grooves has a first surface having a small slope and a second surface having a large slope, the small slope being smaller than the large slope, at least one of bottom portions of the groves which define the corrugated surface is arranged on both outsides of a range of an axial length (La) of the first small diameter portion in an axial direction of the insert portion, at least one of the ribs which define the corrugated surface is arranged within the range of the axial length (La) of the first small diameter portion, at least one of the bottom portions of the grooves which define the corrugated surface is arranged within the range of the axial length (La) of the first small diameter portion, and the column surface has an outer diameter larger than a diameter of the bottom portions of the grooves which define the corrugated surface.

28. The pipe joint according to claim 27, wherein
the elastic material of the soft pipe includes at least one of a resin and a rubber.

29. The pipe joint according to claim 28, wherein
the first small diameter portion is arranged only radially outside of the corrugated surface; and
the cylindrical portion of the sleeve further includes:
a third large diameter portion which is arranged between the second small diameter portion and an opening end, and has an inner diameter being gradually larger toward the opening end.

\* \* \* \* \*